(12) United States Patent
Uchida et al.

(10) Patent No.: US 12,120,278 B2
(45) Date of Patent: Oct. 15, 2024

(54) MULTI-FUNCTION APPARATUS

(71) Applicant: Brother Kogyo Kabushiki Kaisha, Nagoya (JP)

(72) Inventors: Mariko Uchida, Nagoya (JP); Yusuke Ikegami, Nagoya (JP)

(73) Assignee: Brother Kogyo Kabushiki Kaisha, Nagoya (JP)

( * ) Notice: Subject to any disclaimer, the term of this patent is extended or adjusted under 35 U.S.C. 154(b) by 0 days.

(21) Appl. No.: 18/140,439

(22) Filed: Apr. 27, 2023

(65) Prior Publication Data

US 2023/0262177 A1    Aug. 17, 2023

Related U.S. Application Data

(63) Continuation of application No. 17/123,921, filed on Dec. 16, 2020, now Pat. No. 11,689,674, which is a
(Continued)

(30) Foreign Application Priority Data

Aug. 10, 2017 (JP) ................................ 2017-156046

(51) Int. Cl.
*H04N 1/00* (2006.01)
*B65H 1/04* (2006.01)

(52) U.S. Cl.
CPC ............. *H04N 1/0053* (2013.01); *B65H 1/04* (2013.01); *H04N 1/00591* (2013.01);
(Continued)

(58) Field of Classification Search
CPC ........... B65H 2405/11162; B65H 2405/11164; B65H 2405/111643; B65H 2405/11172;
(Continued)

(56) References Cited

U.S. PATENT DOCUMENTS 6,848,685 B2   2/2005  Katsuyama
8,081,899 B2  12/2011  Ito
(Continued)

FOREIGN PATENT DOCUMENTS

JP    862-051559 A    3/1987
JP   2004-154974 A    6/2004
(Continued)

OTHER PUBLICATIONS

Jun. 1, 2021—(JP) Notice of Reasons for Refusal—App 2017-156046, Eng Tran.

*Primary Examiner* — Jeremy R Severson

(74) *Attorney, Agent, or Firm* — Banner & Witcoff, Ltd.

(57) ABSTRACT

A multi-function apparatus employs an in-body sheet discharge type configuration. The image forming device includes a front door and a multi-purpose tray. The front door is movable between a closed position set along a side surface at one side of a case of the image forming device and an opened position opened at the one side with respect to the side surface. The front door has an opening formed therein. The multi-purpose tray is provided to be selectively located at a non-use state at which the multi-purpose tray closes the opening and an in-use position at which the multi-purpose tray opens the opening. When the front door is located at the closed position and the multi-purpose tray is located at the non-use position, an upper end surface of the multi-purpose tray is exposed upward.

13 Claims, 14 Drawing Sheets

Related U.S. Application Data continuation of application No. 16/583,527, filed on Sep. 26, 2019, now Pat. No. 10,873,677, which is a continuation of application No. 15/936,040, filed on Mar. 26, 2018, now Pat. No. 10,477,047.

(52) U.S. Cl.
CPC ..... *H04N 1/00604* (2013.01); *H04N 1/00631* (2013.01); *B65H 2402/46* (2013.01); *B65H 2405/11162* (2013.01); *B65H 2405/11164* (2013.01); *B65H 2405/111643* (2013.01); *B65H 2405/11172* (2013.01); *B65H 2405/324* (2013.01); *B65H 2405/3322* (2013.01); *B65H 2407/21* (2013.01); *B65H 2801/06* (2013.01)

(58) Field of Classification Search
CPC ............. B65H 2405/1122; B65H 3/50; B65H 2402/45; B65H 2402/31; B65H 2407/21; B65H 2405/324; B65H 2405/354; G03G 2215/00392; H04N 1/0053; H04N 1/00604; H04N 1/00631
USPC .......................................... 271/9.09; 399/392
See application file for complete search history.

(56) References Cited

U.S. PATENT DOCUMENTS

| | | | |
|---|---|---|---|
| 8,155,556 B2 | 4/2012 | Moribe et al. | |
| 8,903,301 B2 | 12/2014 | Hattori | |
| 9,016,852 B2 * | 4/2015 | Takemura | B41J 29/13 |
| | | | 347/108 |
| 10,059,542 B2 | 8/2018 | Ikegami | |
| 10,477,047 B2 * | 11/2019 | Uchida | H04N 1/00631 |
| 10,873,677 B2 * | 12/2020 | Uchida | H04N 1/00631 |
| 11,689,674 B2 * | 6/2023 | Uchida | H04N 1/00604 |
| | | | 271/3.14 |
| 2004/0091283 A1 | 5/2004 | Nobe et al. | |
| 2008/0145098 A1 | 6/2008 | Ito | |
| 2008/0174838 A1 | 7/2008 | Akiyama | |
| 2010/0329763 A1 | 12/2010 | Hattori | |
| 2013/0032989 A1 | 2/2013 | Okuchi et al. | |
| 2017/0174464 A1 * | 6/2017 | Tanaka | G03G 15/6552 |
| 2017/0217702 A1 | 8/2017 | Ozeki | |

FOREIGN PATENT DOCUMENTS

| | | |
|---|---|---|
| JP | 2008-152122 A | 7/2008 |
| JP | 2008-174341 A | 7/2008 |
| JP | 2011-007910 A | 1/2011 |
| JP | 2011-011860 A | 1/2011 |
| JP | 2011-075891 A | 4/2011 |
| JP | 2014-196166 A | 10/2014 |
| JP | 5626031 B2 | 11/2014 |
| JP | 2017-076918 A | 4/2017 |

* cited by examiner

FIG. 11
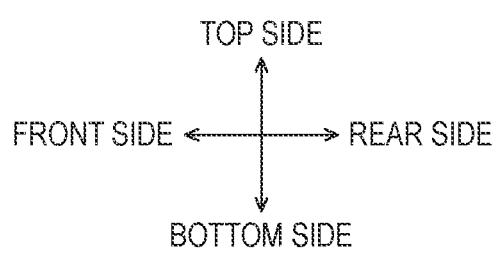
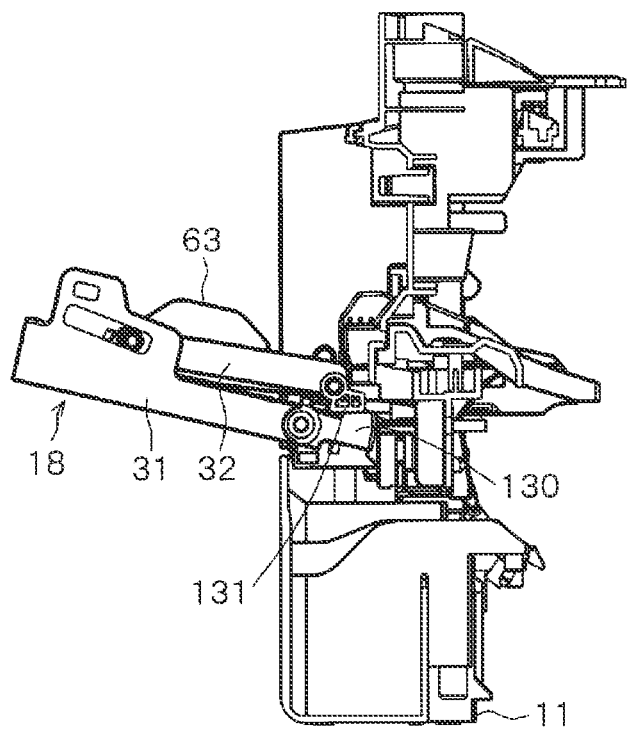

FIG. 12
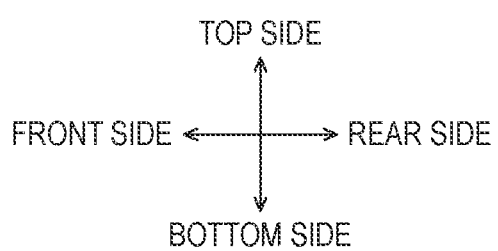
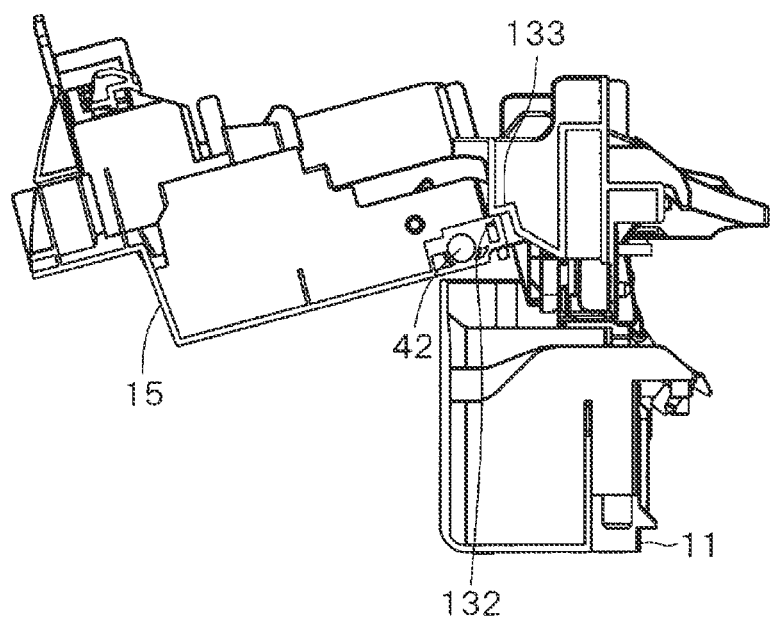

MULTI-FUNCTION APPARATUS

CROSS-REFERENCE TO RELATED APPLICATION

This application is a continuation of U.S. application Ser. No. 17/123,921, filed Dec. 16, 2020, which is a continuation of U.S. application Ser. No. 16/583,527, filed Sep. 26, 2019 (now U.S. Pat. No. 10,873,677 B2), which is a continuation of U.S. application Ser. No. 15/936,040, filed Mar. 26, 2018 (now U.S. Pat. No. 10,477,047 B2), which claims priority from Japanese Patent Application No. 2017-156046 filed on Aug. 10, 2017, the entire subject matters of which are incorporated herein by reference.

TECHNICAL FIELD

The present disclosure relates to a so-called in-body sheet discharge type multi-function apparatus.

BACKGROUND

There is known a multi-function apparatus which includes an image reading device for reading an image from an original document and an image forming device for forming an image on a sheet such as printing paper. The multi-function apparatus may employ a so-called in-body sheet discharge type configuration in which the image reading device and the image forming device are arranged one above the other, and an output tray for discharging a sheet, on which an image is formed, is provided between the image reading device and the image forming device (for example, see JP-A-2008-152122).

When the in-body sheet discharge type multi-function apparatus is reduced in size or specifically height, the height of an opening between the image reading device and the image forming device is also reduced, which makes it difficult to take a sheet out of the output tray.

SUMMARY

The present disclosure has been made in view of the above circumstances, and one of objects of the present disclosure is to provide an in-body sheet discharge type multi-function apparatus which can be reduced in size, while securing a gap (opening height) between an image reading device and an image forming device.

According to an illustrative embodiment of the present disclosure, there is provided a multi-function apparatus including: an image forming device configured to form an image on a sheet; an image reading device configured to read an image from an original document, the image reading device being disposed at a position above the image forming device; and an output tray configured to receive a sheet ejected from the image forming device, the output tray being disposed at a position between the image forming device and the image reading device. The image forming device includes: a case having a first opening on a side surface; a door having a second opening that allows a sheet to pass through, the door being configured to be selectively located at a closed position at which the door closes the first opening and an opened position at which the door opens the first opening; and a sheet tray configured to be selectively located at a non-use position at which the sheet tray closes the second opening and an in-use position at which the sheet tray opens the second opening and the sheet tray supports a sheet. A top surface of the sheet tray is exposed upward in a state where the door is located at the closed position and the sheet tray is located at the non-use position.

BRIEF DESCRIPTION OF THE DRAWINGS

Illustrative aspects of the invention will be described in detail with reference to the following figures where in:

FIG. 11 is a cross-sectional view showing a state where the multi-purpose tray is cut along a surface extending in the side-to-side direction and the front-to-rear direction, while the positioning tray, the first slide tray, the second slide tray, the first turning tray and the second turning tray are stacked over a case, a front door and the opened cover tray;

FIG. 12 is a cross-sectional view showing a state where the case and the front door are cut along a surface extending in the top-to-bottom direction and the front-to-rear direction, illustrating that the front door is located at the closed position;

DETAILED DESCRIPTION

Hereafter, exemplary embodiments of the present disclosure will be described in detail with reference to the accompanying drawings.

Figure 1:
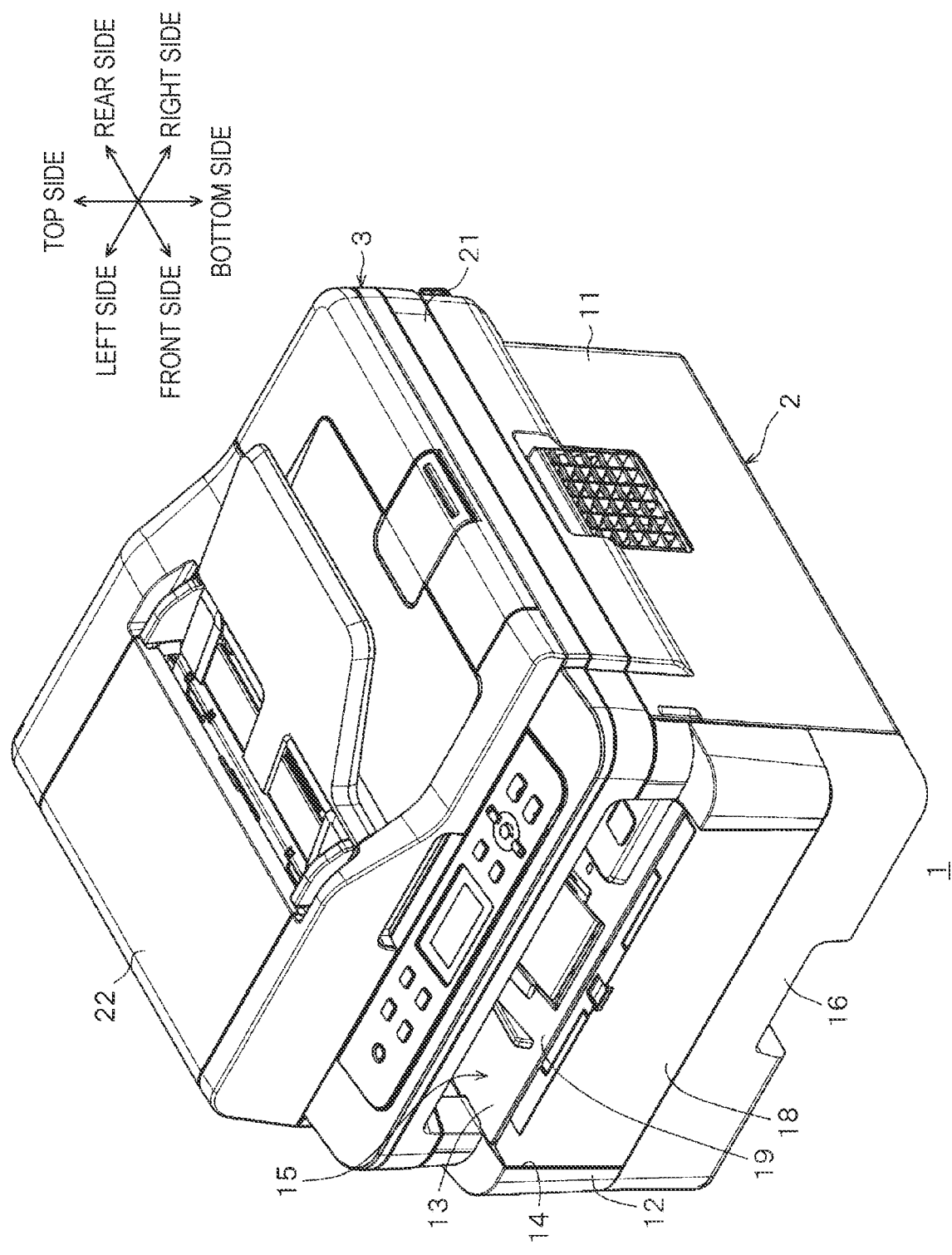
FIG. 1 is a perspective view of a multi-function apparatus according to an embodiment of the present disclosure, illustrating that a multi-purpose tray is located at a non-use position.
Figure 2:
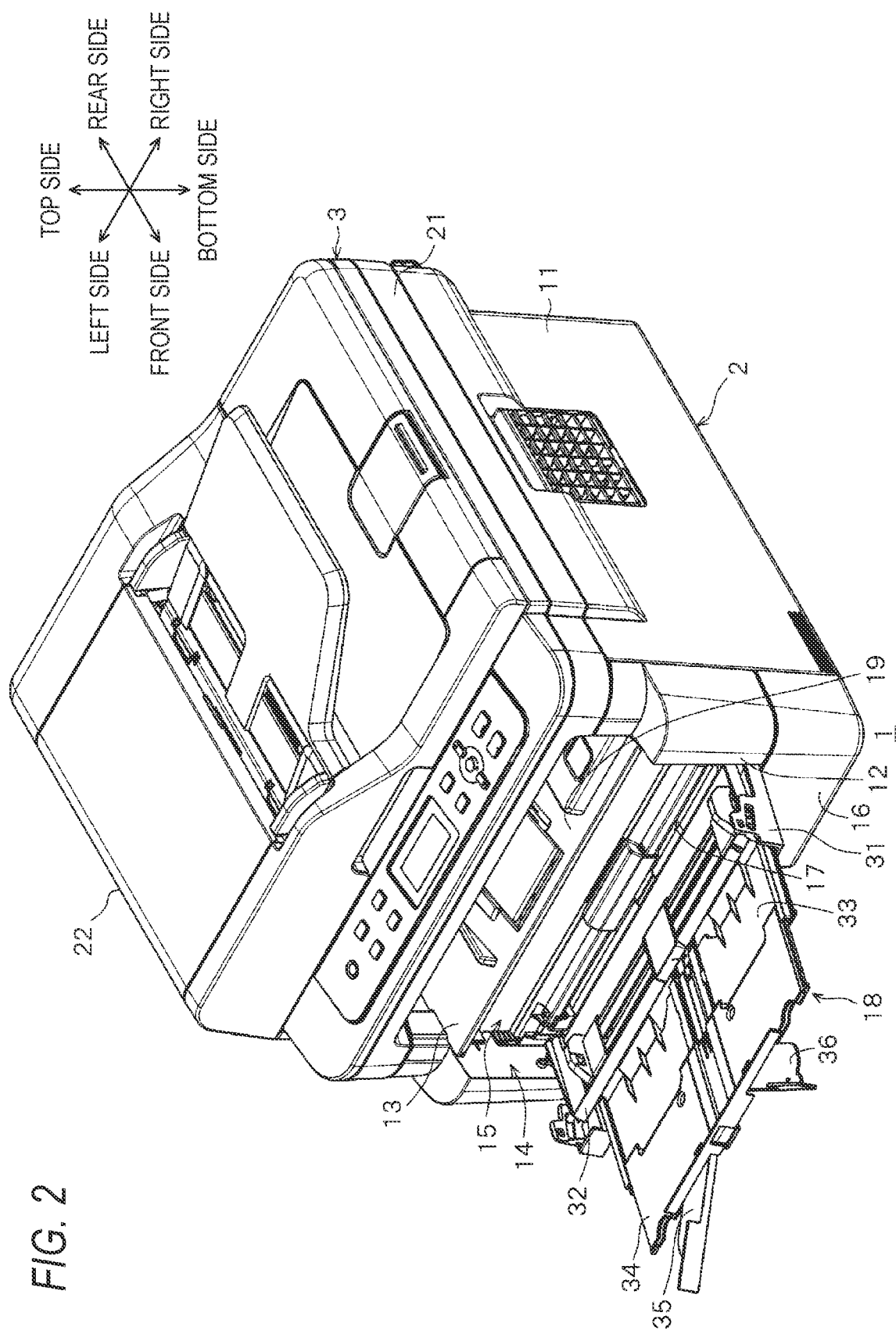
FIG. 2 is a perspective view of the multi-function apparatus, illustrating that the multi-purpose tray is located at an in-use position.

Multi-function apparatus FIGS. 1 and 2 illustrate a multi-function apparatus 1, which may be also called a multi-function peripheral (MFP). The multi-function apparatus 1 has an image forming function (printing function) of forming an image related to image data on a sheet such as printing paper and an image reading function (scanning function) of generating image data by reading an image of an original document. The multi-function apparatus 1 includes an image forming device 2 for the image forming function and an image reading device 3 for the image reading function.

The image forming device 2 includes a case 11 formed in a rectangular parallelepiped shape. The case 11 has an opening 14 formed across one side surface 12 and a top surface 13, the opening 14 connecting the inside and outside of the case 11.

In the following descriptions, the side surface 12 is defined as 'front side' of the multi-function apparatus 1, and the opposite side of the side surface 12 is defined as 'rear side' of the multi-function apparatus 1. Accordingly, the side surface 12 is set to the front surface of the case 11. Furthermore, the left and right sides of the multi-function apparatus 1 are defined, based on when the multi-function apparatus 1 is seen from the front side.

The case 11 has a front door 15 (an example of a door) supported thereon. The front door 15 can be selectively located at a closed position at which the front door 15 closes the opening 14 and an opened position at which the front door 15 opens the opening 14 when being opened forward from the closed position.

The case 11 has a feeding tray 16 provided at the bottom thereof, such that the feeding tray 16 can be inserted into or removed from the case 11. In other words, the feeding tray 16 can be mounted at the bottom of the case 11 so as to be drawn forward from the mounting position thereof. The feeding tray 16 can support a plurality of sheets such as printing papers, which are stacked therein.

As illustrated in FIG. 2, the front door 15 has an opening 17 through which a sheet is passed. Furthermore, a multi-purpose tray 18 (an example of a sheet tray) is supported by the front door 15. The multi-purpose tray 18 can be selectively located at a non-use position at which the multi-purpose tray 18 is positioned along the front surface of the front door 15 so as to close the opening 17 and an in-use position at which the multi-purpose tray 18 is tilted forward from the non-use position so as to open the opening 17. When the multi-purpose tray 18 is located at the in-use position, the multi-purpose tray 18 can support a plurality of sheets stacked therein.

When an image is formed on sheets, the sheets are fed one by one into the case 11 from the feeding tray 16 or the multi-purpose tray 18, and transferred through the case 11. While a sheet is transferred through the case 11, an image (color image or monochrome image) is formed on the sheet by an image forming unit (not illustrated) stored in the case 11. The image forming method by the image forming unit may include an electro-photographic method or inkjet method. The top surface 13 of the case 11 constitutes at least a part of an output tray 19 (an example of an output tray). The image-formed sheet is ejected onto the output tray 19. The sheets ejected onto the output tray 19 are supported by the output tray 19, while being vertically stacked in the output tray 19.

The image reading device 3 is disposed above the image forming device 2. The image reading device 3 includes a main body 21 for containing an image acquisition unit (not illustrated) and an auto document feeder (ADR) 22. The main body 21 has contact glass (not illustrated) provided on the top surface thereof. The ADF 22 can be opened/closed between a position at which the contact glass is exposed and a position at which the contact glass is covered.

The image reading device 3 can read an image through both of a flatbed method and an ADF method. When an image is read through the flatbed method, the ADF 22 is first opened, an original document is placed on the contact glass with a read target surface facing the contact glass, and the ADF 22 is then closed. With the original document covered from the top by the ADF, an image of the read target surface of the original document is read. On the other hand, when an image is read through the ADF method, original documents is placed on a document set position of the ADF 22. The original documents are fed one by one from the document set position, and transferred onto the contact glass. When an original document is passed through the contact glass, an image on a contact surface of the original document with the contact glass is read by the image reading unit. The original documents whose images have been read are ejected to a document ejection position on the top surface of the ADF 22.

Multi-Purpose Tray

Figure 3:
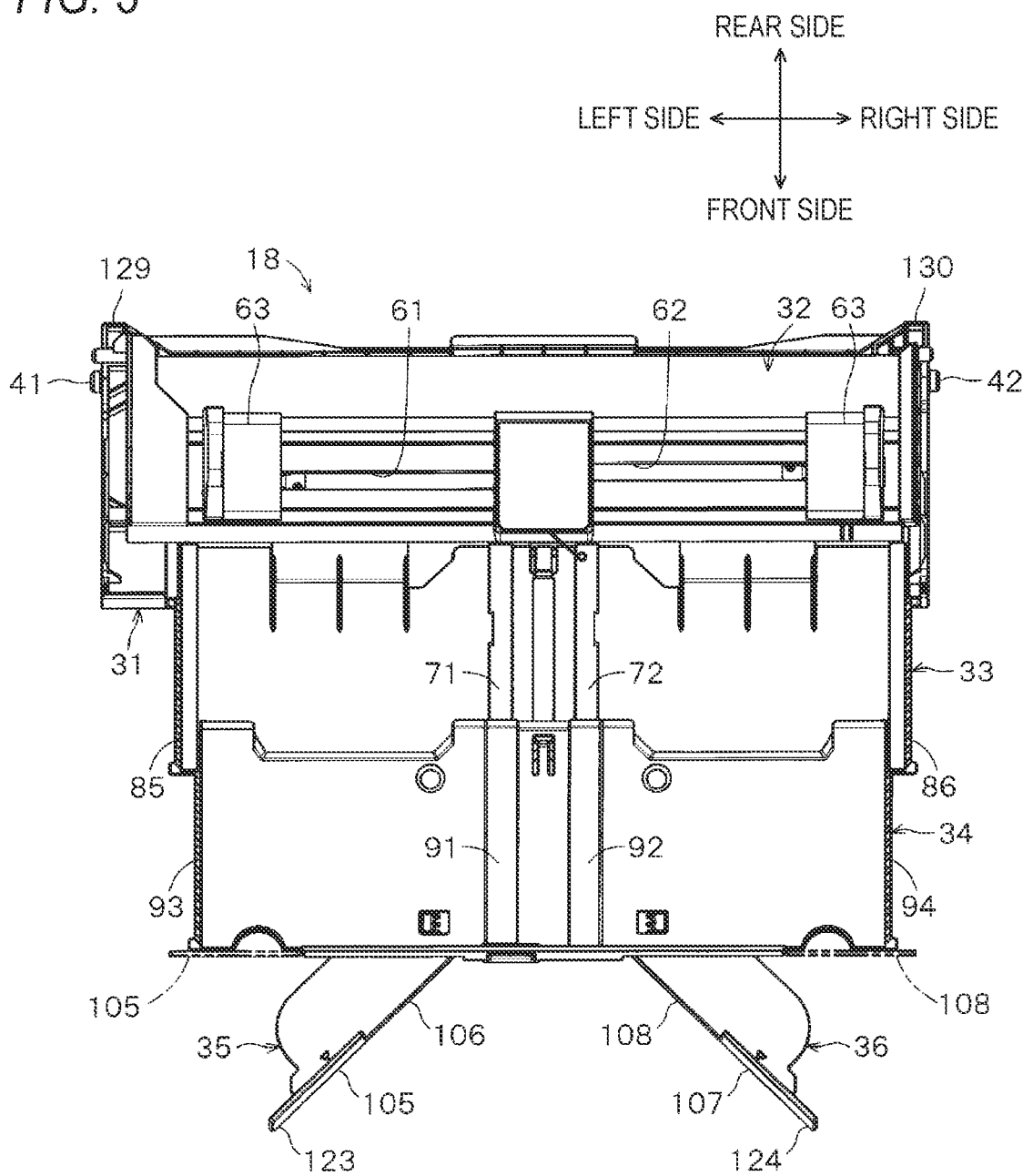
FIG. 3 is a plan view of the multi-purpose tray located at the in-use position.

As illustrated in FIG. 3, the multi-purpose tray 18 includes a cover tray 31 (an example of an outer tray), a positioning tray 32, a first slide tray 33 (an example of a middle tray), a second slide tray 34 (an example of an inner tray), a first turning tray 35 and a second turning tray 36.

Furthermore, a direction used in the following descriptions corresponds to a direction in which the cover tray 31 of the multi-purpose tray 18 is opened.

Cover Tray

Figure 4:
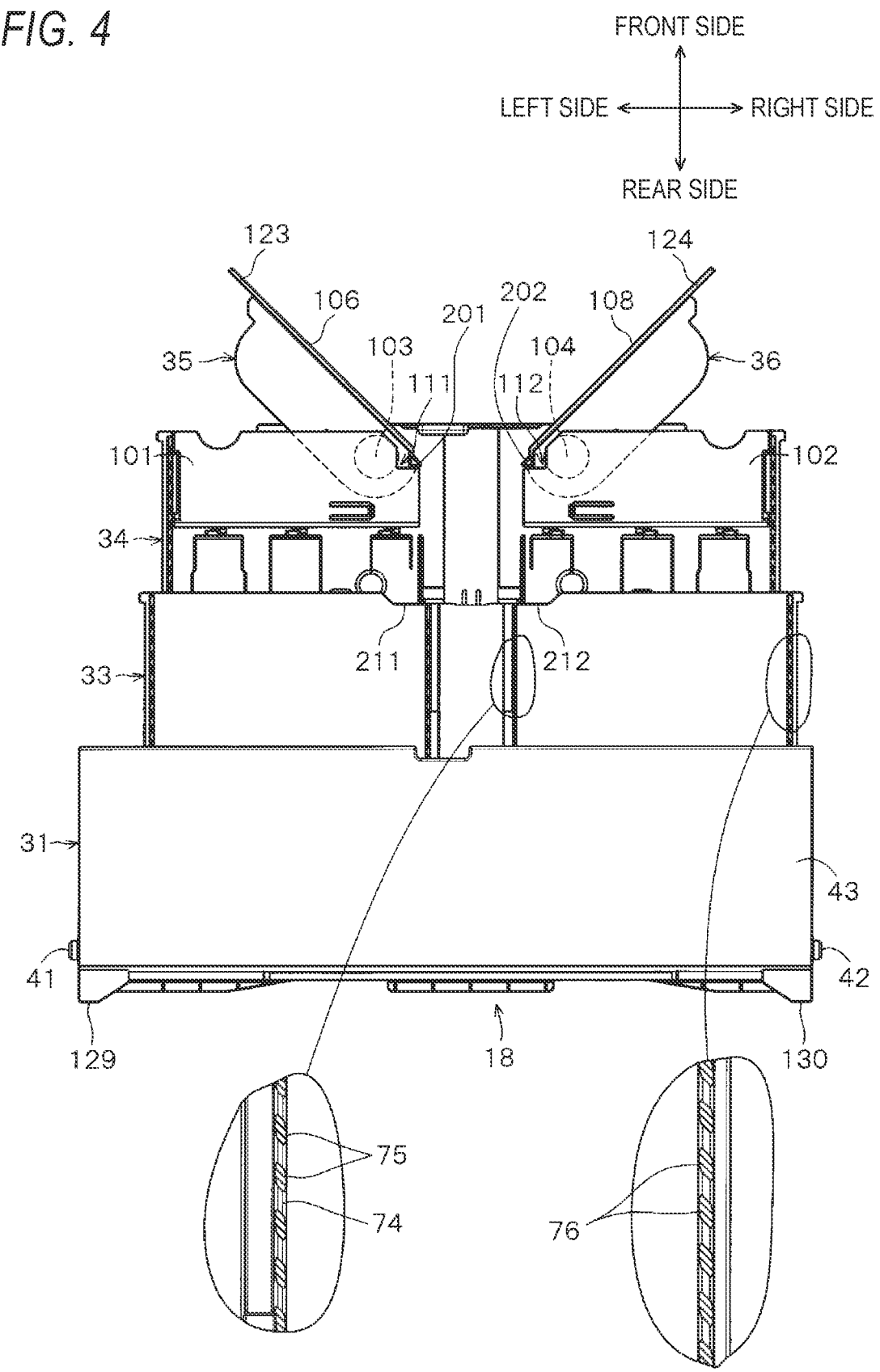
FIG. 4 is a bottom view of the multi-purpose tray located at the in-use position.
Figure 5:
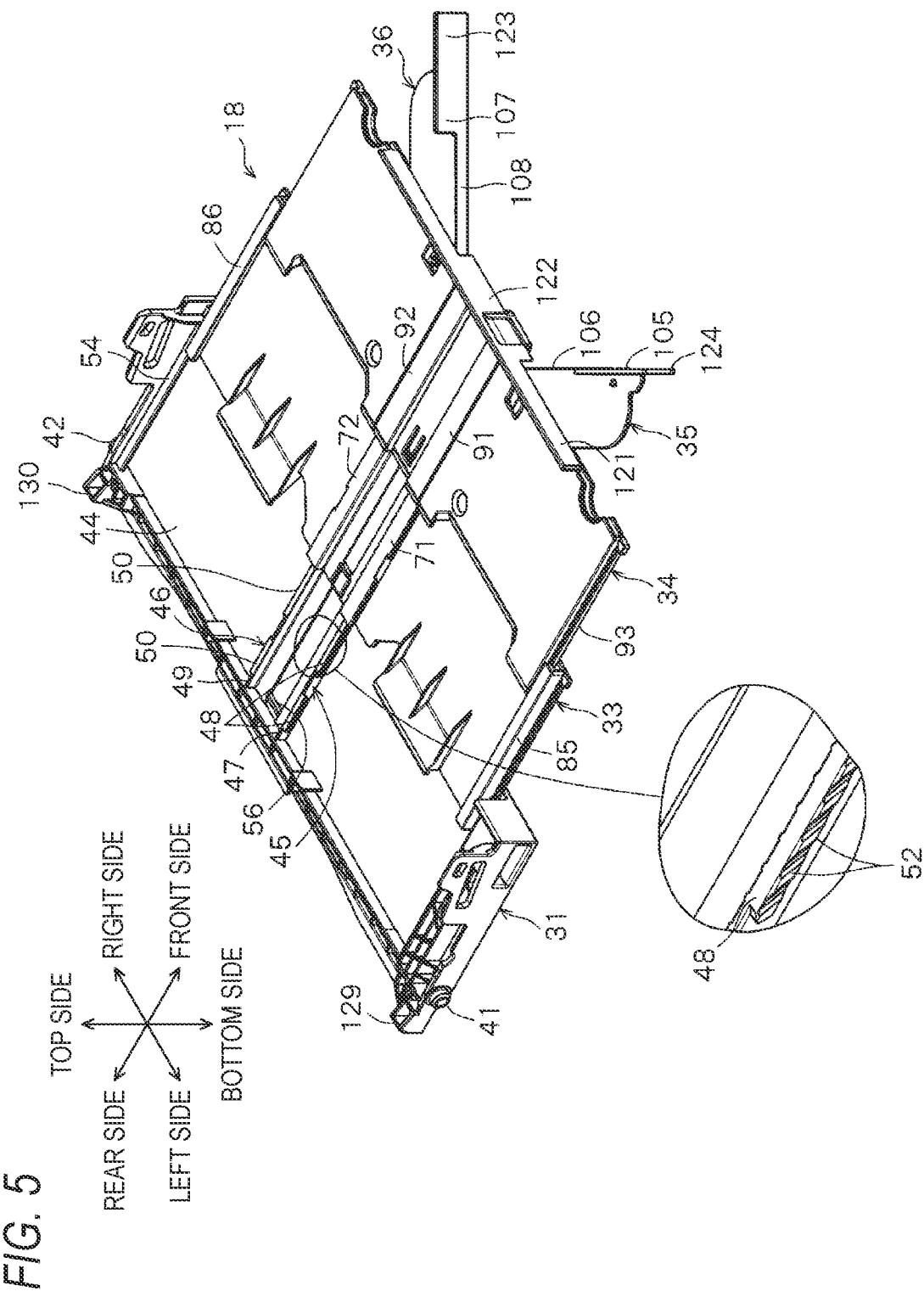
FIG. 5 is a perspective view of the multi-purpose tray located at the in-use position.

The cover tray 31 is the base end portion of the multi-purpose tray 18. As illustrated in FIGS. 4 and 5, the cover tray 31 is formed in a rectangular plate shape. The cover tray 31 has a left shaft part 41 and a right shaft part 42 (an example of a first turning shaft) formed in an end portion thereof at the base end (the rear side when the multi-purpose tray 18 is opened). The left shaft part 41 protrudes to the left side from the left side surface of the cover tray 31. The right shaft part 42 has a common axis line with the left shaft part 41, and protrudes to the right side from the right side surface of the cover tray 31. As the left shaft part 41 and the right shaft part 42 are turnably held by the case 11, the cover tray 31 is supported by the case 11 so as to pivot about the left shaft part 41 and the right shaft part 42 set to a supporting point.

As illustrated in FIG. 4, an outer surface (bottom surface) 43 of the cover tray 31 is formed as a flat surface. The outer surface 43 constitutes the front surface of the front door 15 as illustrated in FIG. 1. When the front door 15 is located at the closed position and the multi-purpose tray 18 is located at the non-use position, the outer surface 43 constitutes a part of the front surface of the case 11.

Figure 6:
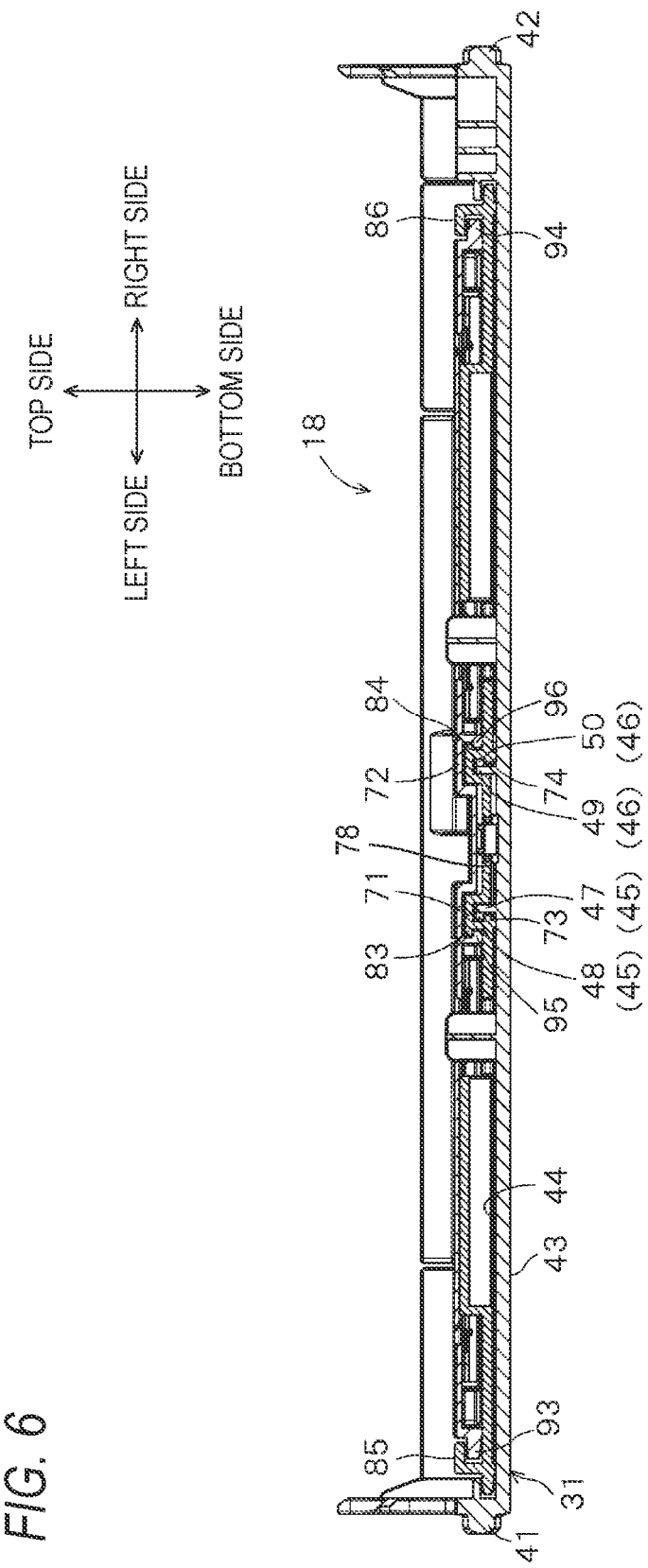
FIG. 6 is a cross-sectional view showing a state where the multi-purpose tray is cut along a surface extending in the side-to-side direction and the top-to-bottom direction, while a positioning tray, a first slide tray, a second slide tray, a first turning tray and a second turning tray are stacked over an opened cover tray.
Figure 7:
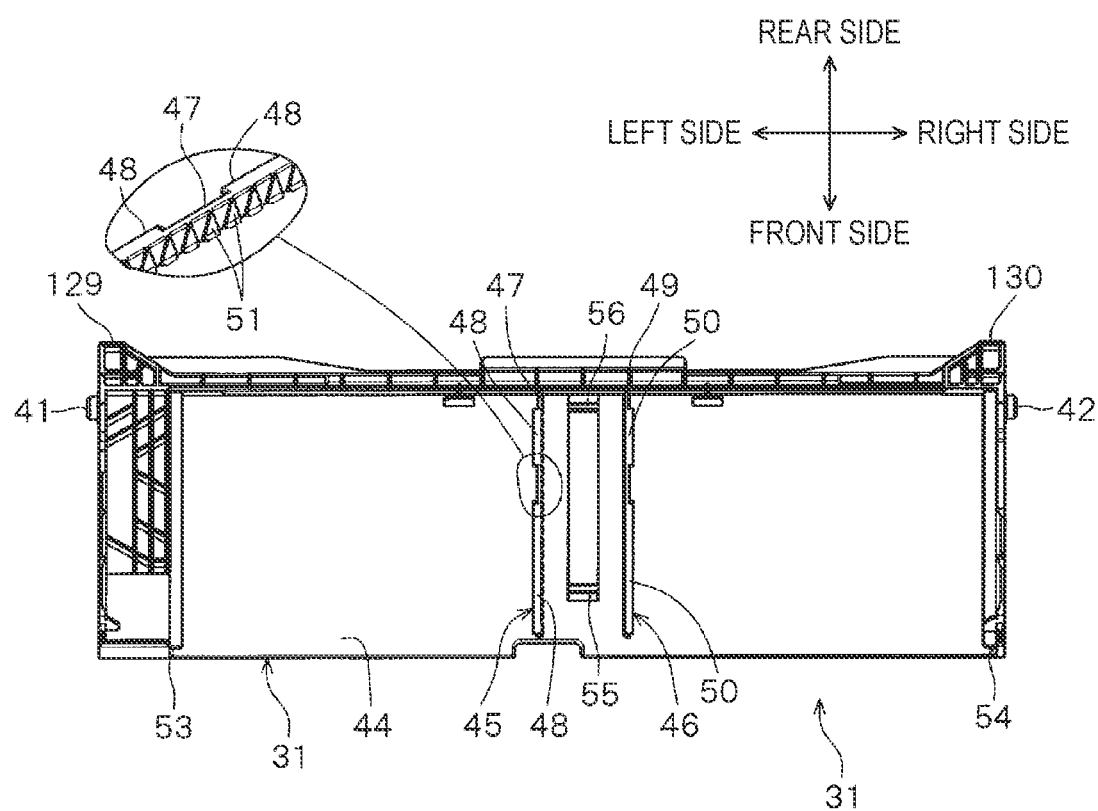
FIG. 7 is a plan view of the cover tray.

As illustrated in FIGS. 5, 6 and 7, the cover tray 31 has a left guide rail 45 and a right guide rail 46 formed on the central portion of the inner surface (top surface) 44 thereof in the side-to-side direction. The left guide rail 45 and the right guide rail 46 are provided at the left and right sides of the central portion of the cover tray 31 in the side-to-side direction so as to sandwich the central portion of the cover tray 31, and form protrusions which are extended in a direction (front-to-rear direction) perpendicular to the side-to-side direction while being arranged in parallel to each other.

The left guide rail 45 has a vertical portion 47 erected vertically from the inner surface 44 and two regulating parts 48 protruding to the left side from the top of the vertical portion 47.

The right guide rail 46 has a vertical portion 49 erected vertically from the inner surface 44 and two regulating parts 50 protruding to the left side from the top of the vertical portion 49.

As illustrated in FIG. 7, the right side surface of the vertical portion 47 of the left guide rail 45 has a plurality of protrusions provided in parallel to each other, such that irregularities are formed thereon. Moreover, as illustrated in FIG. 5, the leading end surface of the regulating part 48 has a plurality of protrusions 52 provided in parallel to each other, such that irregularities are formed thereon.

As illustrated in FIGS. 6 and 7, the cover tray 31 has plate-shaped end regulating parts 53 and 54 formed at the left and right ends thereof, respectively, the end regulating parts 53 and 54 being elongated in the front-to-rear direction. Between the inner surface 44 of the cover tray 31 and the end regulating parts 53 and 54, a space is formed.

As illustrated in FIG. 7, a protrusion 55 is formed between end portions of the left guide rail 45 and the right guide rail 46 at the leading ends thereof, and a protrusion 56 is formed between end portions of the left guide rail 45 and the right guide rail 46 at the base ends thereof. Both of the protrusions 55 and 56 have a trapezoidal shape when seen from the side.

Positioning Tray

As illustrated in FIGS. 2 and 3, the positioning tray 32 is formed in a rectangular plate shape having a smaller size than the cover tray 31, and stacked over the cover tray 31 with a gap formed between the inner surface 44 of the cover tray 31 and the positioning tray 32.

The positioning tray 32 has guide grooves 61 and 62 formed at the left and right sides of the central portion thereof in the side-to-side direction, respectively. The guide grooves 61 and 62 are extended in the side-to-side direction, and formed through the positioning tray 32 in the thickness direction thereof. The positioning tray 32 includes a pair of sheet width guides 63 which can be displaced by the same amount along the guide grooves 61 and 62, respectively, based on the center therebetween. Therefore, the pair of sheet width guides 63 may come close to each other or separate from each other by the same displacement. The gap between the pair of sheet width guides 63 is adjusted according to the side-to-side width of a sheet supported on the multi-purpose tray 18. Furthermore, a sheet is inserted between the pair of sheet width guides 63 from the front side, and placed on the multi-purpose tray 18 based on the center thereof.

First Slide Tray

Figure 8:
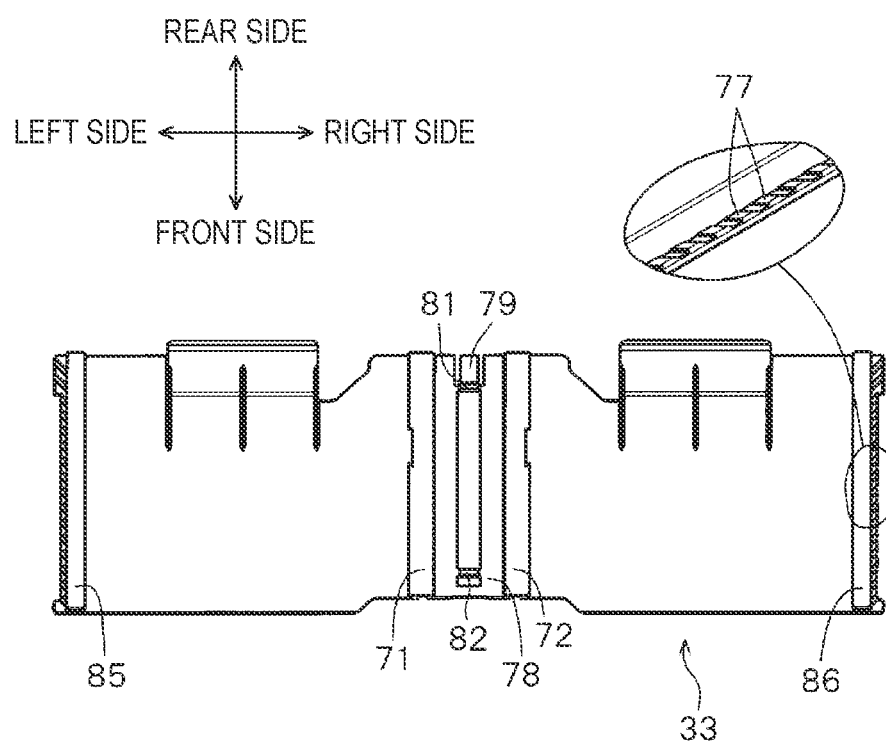
FIG. 8 is a plan view of the first slide tray.

As illustrated in FIGS. 3 and 4, the first slide tray 33 is formed in a rectangular plate shape having a smaller size than the cover tray 31. As illustrated in FIGS. 6 and 8, the first slide tray 33 has center guide parts 71 and 72 (an example of a rail) provided in the central portion thereof in the side-to-side direction. The center guide parts 71 and 72 have a U-shaped cross-sectional shape that covers the left guide rail 45 and the right guide rail 46 of the cover tray 31 from the left and right sides and the top side. Accordingly, while the center guide parts 71 and 72 are guided by the left guide rail 45 and the right guide rail 46, respectively, the first slide tray 33 can be slid between a storage position at which the first slide tray 33 is stored between the cover tray 31 and the positioning tray 32 and an exposure position at which the first slide tray 33 is exposed from between the cover tray 31 and the positioning tray 32, the exposure position corresponding to a more forward position than the storage position.

As illustrated in FIG. 6, the center guide parts 71 and 72 have regulated parts 73 and 74 formed thereon, respectively.

Regardless of the position of the first slide tray 33 in the front-to-rear direction (slide direction) with respect to the cover tray 31, the regulated part 73 faces the regulating part 48 of the left guide rail 45 from the bottom, and the regulated part 74 faces the regulating part 50 of the right guide rail 46 from the bottom. Furthermore, the left and right end portions of the first slide tray 33 are inserted between the inner surface 44 of the cover tray 31 and the end regulating parts 53 and 54, respectively. Therefore, the regulating part 48 of the cover tray 31 faces the regulated parts 73 and 74 from the top, and the end regulating parts 53 and 54 of the cover tray 31 face the left and right end portions of the first slide tray 33, respectively, from the top. Such a structure suppresses the first slide tray 33 from separating upward from the cover tray 31.

As illustrated in FIG. 4, the bottom surfaces of the regulated parts 73 and 74, facing the cover tray 31, have a plurality of protrusions 75 provided in parallel to each other, such that irregularities are formed thereon. The bottom surfaces of the left and right end portions of the first slide tray 33 have a plurality of protrusions 76 provided in parallel to each other, such that irregularities are formed thereon. As illustrated in FIG. 8, the top surfaces of the left and right end portion of the first slide tray 33 have a plurality of protrusions 77 provided in parallel to each other, such that irregularities are formed thereon. The right side surface of the center guide part 71 at the left side has a plurality of protrusions provided in parallel to each other such that irregularities are formed thereon, like the vertical portion 47 of the left guide rail 45.

As illustrated in FIG. 6, the first slide tray 33 has a central portion 78 between the center guide parts 71 and 72. The central portion 78 has a smaller thickness than outer portions of the center guide parts 71 and 72 in the side-to-side direction, that is, the left potion of the center guide part 71 and the right portion of the center guide part 72.

As illustrated in FIG. 8, the central portion 78 has a claw part 79 provided at the rear end thereof. The claw part 79 is formed by cutting two places in a slit shape extending from the rear edge of the central portion 78 to the front side, the two places being spaced from each other in the central portion 78 in the side-to-side direction. The claw part 79 corresponds to a portion between the slit-shaped notches. Therefore, the leading end (front end) of the claw part 79 is set to a free end. The claw part 79 has a convex portion formed at the leading end thereof, the convex portion being convex downward.

When the first slide tray 33 is located at the storage position, the convex portion of the claw part 79 is located at the rear side of the protrusion 56 of the cover tray 31. Furthermore, when the first slide tray 33 is located at the exposure position, the convex portion of the claw part 79 is located at the front side of the protrusion 55 of the cover tray 31. When the convex portion is moved across the protrusions 55 and 56, the claw part 79 is elastically deformed, and the convex portion is placed on the protrusions 55 and 56. Then, when the convex portion is moved over the protrusions 55 and 56, the claw part 79 is restored to the original state. Accordingly, when a user slides the first slide tray 33 from the storage position or the exposure position or returns the first slide tray 33 to the storage position or the exposure position, the user can have a click feel. Furthermore, the first slide tray 33 can be held at the storage position and the exposure position.

The central portion 78 has protrusions 81 and 82 formed thereon, the protrusions 81 and 82 having a trapezoidal shape when seen from a side. The protrusion 81 is located at the front side of the claw part 79. The protrusion 82 is located at the front end of the central portion 78.

As illustrated in FIG. 6, the center guide parts 71 and 72 have regulating parts 83 and 84 formed at the tops thereof, respectively, with a gap formed therebetween in the front-to-rear direction. The regulating part 83 protrudes to the left side from the center guide part 71 at the left side, and extends in the front-to-bottom direction. The leading end surface of the regulating part 83 has a plurality of protrusions provided in parallel to each other such that irregularities are formed thereon, like the regulating part 48 of the cover tray 31. The regulating part 84 protrudes to the right side from the center guide part 72 at the right side, and extends in the front-to-rear direction.

The first slide tray 33 has a left guide part 85 provided at the left end of the first slide tray 33 and a right guide part 86 provided at the right end of the first slide tray 33. The left guide part 85 has an L-shaped cross-section that is erected upward from the top surface of the first slide tray 33 and bent and extended to the right side. The right guide part 86 has an L-shaped cross-section that is erected upward from the top surface of the first slide tray 33 and bent and extended to the left side.

Second Slide Tray

As illustrated in FIGS. 3 and 4, the second slide tray 34 is formed in a rectangular plate shape having a smaller size than the first slide tray 33. The second slide tray 34 has center guide parts 91 and 92 (an example of a slider) provided in the central portion thereof in the side-to-side direction. As illustrated in FIG. 6, the center guide parts 91 and 92 have a U-shaped cross-section that covers the center guide parts 71 and 72 of the first slide tray 33 from the left and right sides and the top side. Furthermore, the second slide tray 34 has a left guide part 93 and a right guide part 94 provided at the left and right ends thereof, respectively. The left guide part 93 and the right guide part 94 are formed in a plate shape extending in the side-to-side direction and the front-to-rear direction, and inserted between the top surface of the first slide tray 33 and the left guide part 85 and the right guide part 86, respectively. Accordingly, while the center guide parts 91 and 92 of the second slide tray 34 are guided by the center guide parts 71 and 72 of the first slide tray 33, respectively, and the left guide part 93 and the right guide part 94 are guided by the left guide part 85 and the right guide part 86 of the first slide tray 33, respectively, the second slide tray 34 can be slid between an overlap position at which the second slide tray 34 overlaps the top of the first slide tray 33 and a draw position at which the second slide tray 34 is drawn forward from the overlap position such that the overlap between the first slide tray 33 and the second slide tray 34 is reduced.

As the first slide tray 33 is located at the storage position and the second slide tray 34 is located at the overlap position, the second slide tray 34 overlaps the top of the cover tray 31. The position of the second slide tray 34 at this time may be set to the overlap position.

The center guide parts 91 and 92 have regulated parts 95 and 96 formed thereon. Regardless of the position of the second slide tray 34 in the front-to-rear direction (slide direction) with respect to the first slide tray 33, the regulated part 95 faces the regulating part 83 of the first slide tray 33 from the bottom, and the regulated part 96 faces the regulating part 84 of the first slide tray 33 from the bottom. Therefore, the regulating parts 83 and 84 of the first slide tray 33 face the regulated parts 95 and 96 from the top, respectively, and the left guide part 85 and the right guide part 86 of the first slide tray 33 face the left and right ends of the second slide tray 34 from the top, respectively. Such a structure can suppress the second slide tray 34 from separating upward from the first slide tray 33.

The bottom surfaces of the regulated parts 95 and 96, facing the first slide tray 33, have a plurality of protrusions provided in parallel to each other such that irregularities are formed thereon, like the regulated parts 73 and 74 of the first slide tray 33. The bottom surfaces of the left and right end portions of the second slide tray 34 also have a plurality of protrusions provided in parallel to each other such that irregularities are formed thereon, like the left and right end portions of the first slide tray 33. The top surfaces of the left and right end portions of the second slide tray 34 also have a plurality of protrusions provided in parallel to each other such that irregularities are formed thereon, like the left and right end portions of the first slide tray 33.

Figure 9:
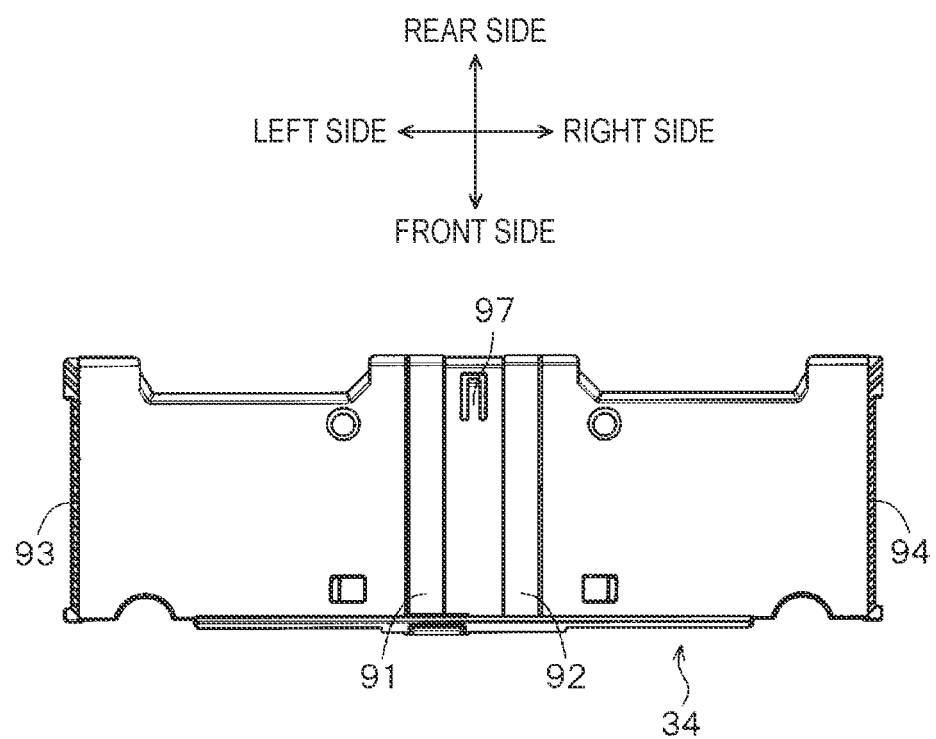
FIG. 9 is a plan view of the second slide tray.

As illustrated in FIG. 9, a claw part 97 is provided at the rear end portion between the center guide parts 91 and 92. The claw part 97 is formed by cutting two places in a slit shape extending in the front-to-rear direction, the two places being spaced from each other in the second slide tray 34 in the side-to-side direction, and cutting a portion between the rear end portions of the slit-shaped notches in a slit shape such that the rear end portions of the slit-shaped notches are connected to each other. The claw part 97 is formed as a portion of which the left and right sides and the rear side are surrounded by the slit-shaped notches. Therefore, the leading end (front end) of the claw part 97 is set to a free end. The claw part 97 has a convex portion formed at the leading end thereof, the convex portion being convex downward.

When the second slide tray 34 is located at the overlap position, the convex portion of the claw part 97 is located at the rear side of the protrusion 81 of the first slide tray 33. Furthermore, when the second slide tray 34 is located at the draw position, the convex portion of the claw part 97 is located at the front side of the protrusion 82 of the first slide tray 33. When the convex portion is moved across the protrusions 81 and 82, the claw part 97 is elastically deformed, and the convex portion is placed on the protrusions 81 and 82. Then, when the convex portion is moved over the protrusions 81 and 82, the claw part 97 is restored to the original state. Accordingly, when a user start to slide the second slide tray 34 from the overlap position or the draw position or returns the second slide tray 34 to the overlap position or the draw position, the user can have a click feel. Furthermore, the second slide tray 34 can be held at the overlap position and the draw position.

Turning Tray

As illustrated in FIGS. 3 to 5, the first turning tray 35 and the second turning tray 36 are symmetrically provided at the front end of the second slide tray 34 with the center guide parts 91 and 92 interposed therebetween, and the first turning try 35 and the second turning tray 36 are turnably supported by the second slide tray 34.

Specifically, as illustrated in FIG. 4, covers 101 and 102 are mounted on the bottom surface of the front end portion of the second slide tray 34. Furthermore, as illustrated by a dashed line of FIG. 4, turning shafts 103 and 104 are formed between the bottom surfaces of the second slide tray 34 and the covers 101 and 102. More specifically, the turning shafts 103 and 104 are formed at positions separated by the same distance from the center guide part 91 to the left and from the center guide part 92 to the right.

The first turning tray 35 at the left side is formed in a plate shape extending in one direction, and the turning shaft 103 is inserted into one end portion of the first turning tray 35 in the longitudinal direction thereof with a clearance provided therebetween, and held between the second slide tray 34 and the cover 101. Thus, the first turning tray 35 is can be turned about the turning shaft 103 set to a supporting point. Through the turn, the first turning tray 35 is selectively located at a folded position at which the first turning tray 35 is extended to the left side from the turning shaft 103 so as to overlap the second slide tray 34 from the bottom and an extended position at which the first turning tray 35 is extended to the left side such that the overlap with the second slide tray 34 is reduced.

The second turning tray 36 at the right side is formed in a plate shape extending in one direction, and the turning shaft 104 is inserted into one end portion of the second turning tray 36 in the longitudinal direction thereof with a clearance provided therebetween, and held between the second slide tray 34 and the cover 102. Thus, the second turning tray 36 can be turned about the turning shaft 104 set to a supporting point. Through the turn, the second turning tray 36 is selectively located at a folded position at which the second turning tray 36 is extended to the left side from the turning shaft 104 so as to overlap the second slide tray 34 from the bottom and an extended position at which the second turning tray 36 is extended to the right side such that the overlap with the second slide tray 34 is reduced.

As illustrated in FIG. 5, the first turning tray 35 has an upper protrusion part 105 (an example of a second protrusion part) and a lower protrusion part 106 which are formed at the front end thereof. The upper protrusion part 105 protrudes upward from the front edge of the left end portion of the first turning tray 35, and the left end portion of the upper protrusion part 105 protrudes to the left side over the left end of the first turning tray 35. The lower protrusion part 106 protrudes downward from the entire area of the front edge of the first turning tray 35, and the left end portion of the lower protrusion part 106 protrudes to the left over the left end of the first turning tray 35 so as to reach the same position as the upper protrusion part 105. Furthermore, as illustrated in FIG. 4, the right end portion of the lower protrusion part 106 has a V-shaped structure that is bent to the rear side and folded back to the front side.

As illustrated in FIG. 5, the second turning tray 36 has an upper protrusion part 107 (an example of the second protrusion part) and a lower protrusion part 108 which are formed at the front end thereof. The upper protrusion part 107 protrudes upward from the front edge of the right end portion of the second turning tray 36, and the right end portion of the upper protrusion part 107 protrudes to the right side over the right end of the second turning tray 36. The lower protrusion part 108 protrudes downward from the entire area of the front edge of the second turning tray 36, and the right end portion of the lower protrusion part 108 protrudes to the right over the right end of the second turning tray 36 so as to reach the same position as the upper protrusion part 107. Furthermore, as illustrated in FIG. 4, the left end portion of the lower protrusion part 108 has a V-shaped structure that is bent to the rear side and folded back to the front side.

The covers 101 and 102 have notch portions 111 and 112 formed at the central end portions in the side-to-side direction in the front end portions thereof, the notch portions 111 and 112 being notched in a rectangular shape.

When the first turning tray 35 is located at the folded position, the upper protrusion part 105 of the first turning tray 35 is brought in contact with the front edge of the second slide tray 34, and the lower protrusion part 106 is brought in contact with the cover 101. Accordingly, the first turning tray 35 is prevented from being inserted between the second slide tray 34 and the cover 101 beyond the folded position. When the first turning tray 35 is turned toward the extended position from the folded position, the right end portion of the lower protrusion part 106, bent in a V-shape, is brought in contact with the notch portion 111 of the cover 101. The contact suppresses the first turning tray 35 from being turned beyond the extended position from the folded position.

When the second turning tray 36 is located at the folded position, the upper protrusion part 107 of the second turning tray 36 is brought in contact with the front edge of the second slide tray 34, and the lower protrusion part 108 is brought in contact with the cover 102, like the first turning tray 35. Accordingly, the second turning tray 36 is prevented from being inserted between the second slide tray 34 and the cover 102 beyond the folded position. When the second turning tray 36 is turned toward the extended position from the folded position, the left end portion of the lower protrusion part 108, bent in a V-shape, is brought in contact with the notch portion 112 of the cover 102. The contact suppresses the second turning tray 36 from being turned beyond the extended position from the folded position.

As illustrated in FIG. 4, the first turning tray 35 has a contact portion 201, the second turning tray 36 has a contact portion 202, and the first slide tray 33 has contact portions 211 and 212.

When the second slide tray 34 is pushed into the first slide tray 33 while the first turning tray 35 is located at the extended position, the contact portion 201 of the first turning tray 35 is pushed forward by the contact with the contact portion 211 of the first slide tray 33. As a result, the first turning tray 35 is turned around the turning shaft 103 and displaced to the folded position. Similarly, when the second slide tray 34 is pushed into the first slide tray 33 while the second turning tray 36 is located at the extended position, the contact portion 202 of the second turning tray 36 is pushed forward by the contact with the contact portion 212 of the first slide tray 33, and the second turning tray 36 is turned around the turning shaft 104 and displaced to the folded position.

Usage Mode of Multi-Purpose Tray

As illustrated in FIG. 5, the upper protrusion part 121 and the lower protrusion part 122 (an example of the first protrusion part) are formed at the front end of the second slide tray 34. The upper protrusion part 121 protrudes upward from between the portions with which the upper protrusion part 105 of the first turning tray 35 and the upper protrusion part 107 of the second turning tray 36 are brought in contact at the front edge of the second slide tray 34, respectively. The upper protrusion part 121 is designed to have the same thickness as the upper protrusion part 105 of the first turning tray 35 and the upper protrusion part 107 of the second turning tray 36. The lower protrusion part 122 protrudes downward from the central portion of the front edge of the second slide tray 34. The lower protrusion part 122 is designed to have the same thickness as the lower protrusion part 106 of the first turning tray 35 and the lower protrusion part 108 of the second turning tray 36.

Figure 10:
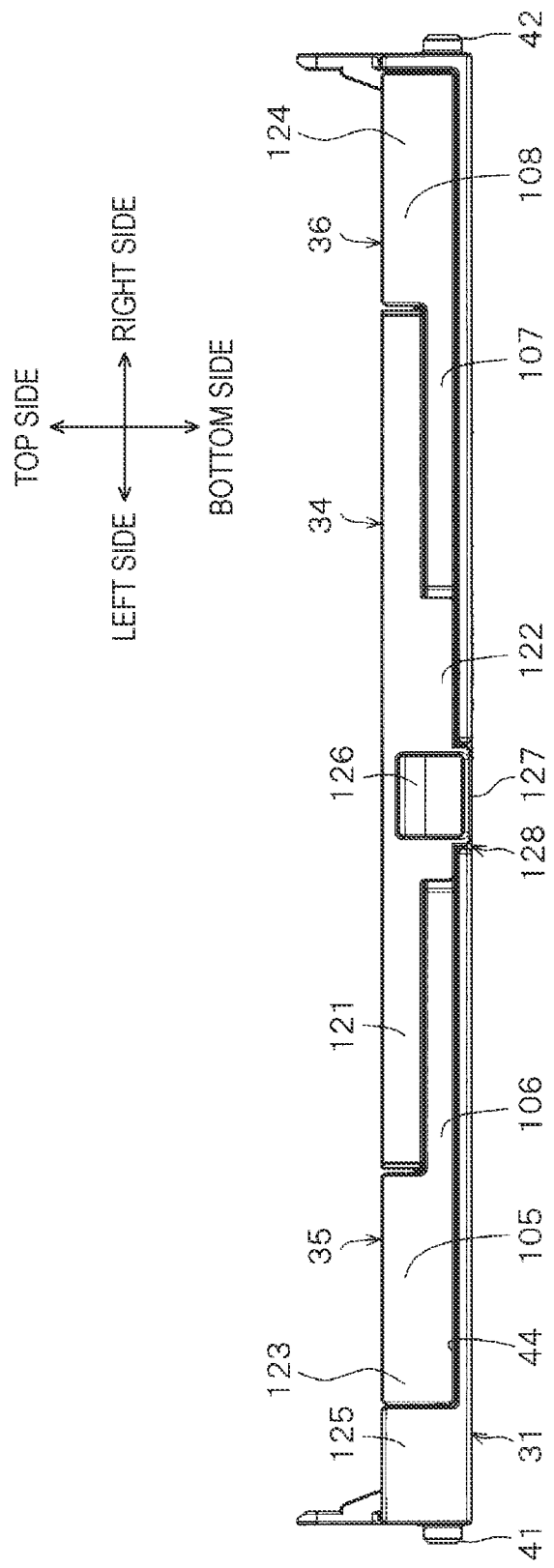
FIG. 10 is a front view of the multi-purpose tray in a state where the positioning tray, the first slide tray, the second slide tray, the first turning tray and the second turning tray are stacked over the opened cover tray.

When the first turning tray 35 and the second turning tray 36 are located at the folded position, the upper protrusion part 105 of the first turning tray 35 is aligned on a straight line with the left side of the upper protrusion part 121 of the second slide tray 34, and the upper protrusion part 107 of the second turning tray 36 is aligned on a straight line with the right side of the upper protrusion part 121, as illustrated in FIG. 10. The lower protrusion part 106 of the first turning tray 35 is aligned on a straight line with the left side of the lower protrusion part 122 of the second slide tray 34, and the lower protrusion part 108 of the second turning tray 36 is aligned on a straight line with the right side of the lower protrusion part 122.

When the first turning tray 35 and the second turning tray 36 are located at the folded position, the left protrusion part 123 (an example of the first protrusion part) configured by the left end portions of the upper protrusion part 105 and the lower protrusion part 106 of the first turning tray 35 faces the left guide part 85 at the left end of the first slide tray 33, and the right protrusion part 124 (an example of the second protrusion part) constituted by the right end portions of the upper protrusion part 107 and the lower protrusion part 108 of the second turning tray 36 faces the right guide part 86 at the right end of the first slide tray 33, as indicated by a two-dot chain line of FIG. 3.

Furthermore, when the first turning tray 35 and the second turning tray 36 are located at the folded position and the second slide tray 34 is located at the overlap position, the left protrusion part 123 is brought in contact with the front edge and the left guide part 85 of the first slide tray 33, and the right protrusion part 124 is brought in contact with the front edge and the right guide part 86 of the first slide tray 33. Accordingly, the left guide part 85 of the first slide tray 33 is covered by the left protrusion part 123, and the right guide part 86 is covered by the right protrusion part 124. Therefore, it is possible to improve the design effect when the first turning tray 35 and the second turning tray 36 are located at the folded position and the second slide tray 34 is located at the overlap position.

The cover tray 31 has a wall-shaped part 125 formed at the left front end thereof, the wall-shaped part 125 protruding upward from the front edge of the cover tray 31. The wall-shaped part 125 is designed to have the same thickness as the upper protrusion part 105 and the lower protrusion part 106 of the first turning tray 35.

When the first turning tray 35 and the second turning tray 36 are located at the folded position, the second slide tray 34 is located at the overlap position, and the first slide tray 33 is located at the storage position, the upper protrusion part 105 and the lower protrusion part 106 of the first turning tray 35, the upper protrusion part 107 and the lower protrusion part 108 of the second turning tray 36, and the upper protrusion part 121 and the lower protrusion part 122 of the second slide tray 34 are located on the front edge of the first turning tray 35, and the upper protrusion part 105 and the lower protrusion part 106 of the first turning tray 35 are located at the right side of the wall-shaped part 125, as illustrated in FIG. 10. Accordingly, the front surfaces of the upper protrusion part 105 and the lower protrusion part 106 of the first turning tray 35, the upper protrusion part 107 and the lower protrusion part 108 of the second turning tray 36, the upper protrusion part 121 and the lower protrusion part 122 of the second slide tray 34 and the wall-shaped part 125 of the cover tray 31 are flush with each other, thereby forming a thin rectangular plane surface which is elongated in the side-to-side direction.

When the front door 15 is located at the closed position and the multi-purpose tray 18 is located at the non-use position, the plane surface formed by the front surfaces of the upper protrusion part 105 and the lower protrusion part 106 of the first turning tray 35, the upper protrusion part 107 and the lower protrusion part 108 of the second turning tray 36, the upper protrusion part 121 and the lower protrusion part 122 of the second slide tray 34, and the wall-shaped part 125 of the cover tray 31 is flush with the top surface 13 of the case 11, thereby constituting the output tray 19 with the top surface 13.

The second slide tray 34 has a concave portion 126 across the upper protrusion part 121 and the lower protrusion part 122 thereof, the concave portion 126 being recessed by one stage. Under the concave portion 126, a protrusion is formed as a finger grip part 127 which protrudes downward from the lower protrusion part 122 and extends in the side-to-side direction. As illustrated in FIG. 7, the cover tray 31 has a notch portion 128 formed at the central portion of the front end thereof, the notch portion 128 being notched in a rectangular shape at the rear side thereof. When the first turning tray 35 and the second turning tray 36 are located at the folded position, the second slide tray 34 is located at the overlap position, and the first slide tray 33 is located at the storage position, the finger grip part 127 is fitted to the notch portion 128 of the cover tray 31 as illustrated in FIG. 10.

When the finger grip part 127 is held by a user's finger and drawn to the front side while the front door 15 is located at the closed position and the multi-purpose tray 18 is located at the non-use position, the lower protrusion part 122 of the second slide tray 34 is placed on the front edge of the cover tray 31. Therefore, a force applied to the finger grip part 127 is transferred to the cover tray 31, and the cover tray 31, the positioning tray 32, the first slide tray 33, the second slide tray 34, the first turning tray 35 and the second turning tray 36 are reclined forward as one body, with the left right shaft part 41 and the right shaft part 42 of the cover tray 31 set to a supporting point.

As illustrated in FIGS. 7 and 11, the left rear end portion 129 and the right rear end portion 130 (an example of a first stopper) of the cover tray 31 are extended more backward than the left shaft part 41 and the right shaft part 42, respectively. When the multi-purpose tray 18 is reclined forward from the non-use position while the front door 15 is located at the closed position, the right rear end portion 130 comes in contact with a predetermined portion 131 of the front door 15 from the bottom as illustrated in FIG. 11. Furthermore, although not illustrated, the left rear end portion 129 comes in contact with a predetermined portion of the front door 15 from the bottom. Accordingly, the left rear end portion 129 and the right rear end portion 130 of the cover tray 31 perform the function of a stopper for regulating a turn amount of the multi-purpose tray 18.

The multi-purpose tray 18 can be reclined forward from the non-use position and used even when the first turning tray 35 and the second turning tray 36 are located at the folded position, the second slide tray 34 is located at the overlap position, and the first slide tray 33 is located at the storage position. In this state, a small-size sheet such as a postcard is supported by the positioning tray 32 and the upper protrusion part 121 of the second slide tray 34.

Furthermore, a middle-size sheet such as a B5 size sheet is supported by the positioning tray 32, the first slide tray 33 and the second slide tray 34, when the first slide tray 33 is drawn to the exposure position from the storage position and the second slide tray 34 is drawn to the draw position from the overlap position after the multi-purpose tray 18 is reclined forward from the non-use position.

When the first turning tray 35 and the second turning tray 36 are displaced from the folded position to the extended position and the multi-purpose tray 18 is located at the in-use position after the first slide tray 33 is drawn to the exposure position from the storage position and the second slide tray 34 is drawn to the draw position from the overlap position, a large-size sheet such as an A4 size sheet can be supported on the first slide tray 33, the second slide tray 34, the first turning tray 35 and the second turning tray 36.

When the multi-purpose tray 18 is located at the in-use position, the multi-purpose tray 18 is extended forward from the case 11 such that the leading end thereof is located at a position under the front edge of the output tray 19 as illustrated in FIG. 2. Accordingly, an image-formed sheet ejected onto the output tray 19 can be suppressed from coming in contact with a sheet supported by the multi-purpose tray 18. Therefore, the image-formed sheet can be prevented from being fed into the case 11 with a sheet on the multi-purpose tray 18.

Closed Position of Front Door

As illustrated in FIG. 12, the front door 15 is selectively located at the closed position and the opened position, with the turning shaft of the multi-purpose tray 18, which is, the left shaft part 41 and the right shaft part 42 of the cover tray 31 set to a supporting point. The front door 15 has an extension portion 132 (an example of a second stopper) extended downward from the left shaft part 41 and the right shaft part 42 when the front door 15 is located at the closed position. Furthermore, when the front door 15 is located at the closed position, the extension portion 132 is brought in contact with a frame 133 provided in the case 11 from the bottom. Accordingly, the extension portion 132 performs the function of a stopper for regulating a turn amount of the front door 15.

Figure 13:
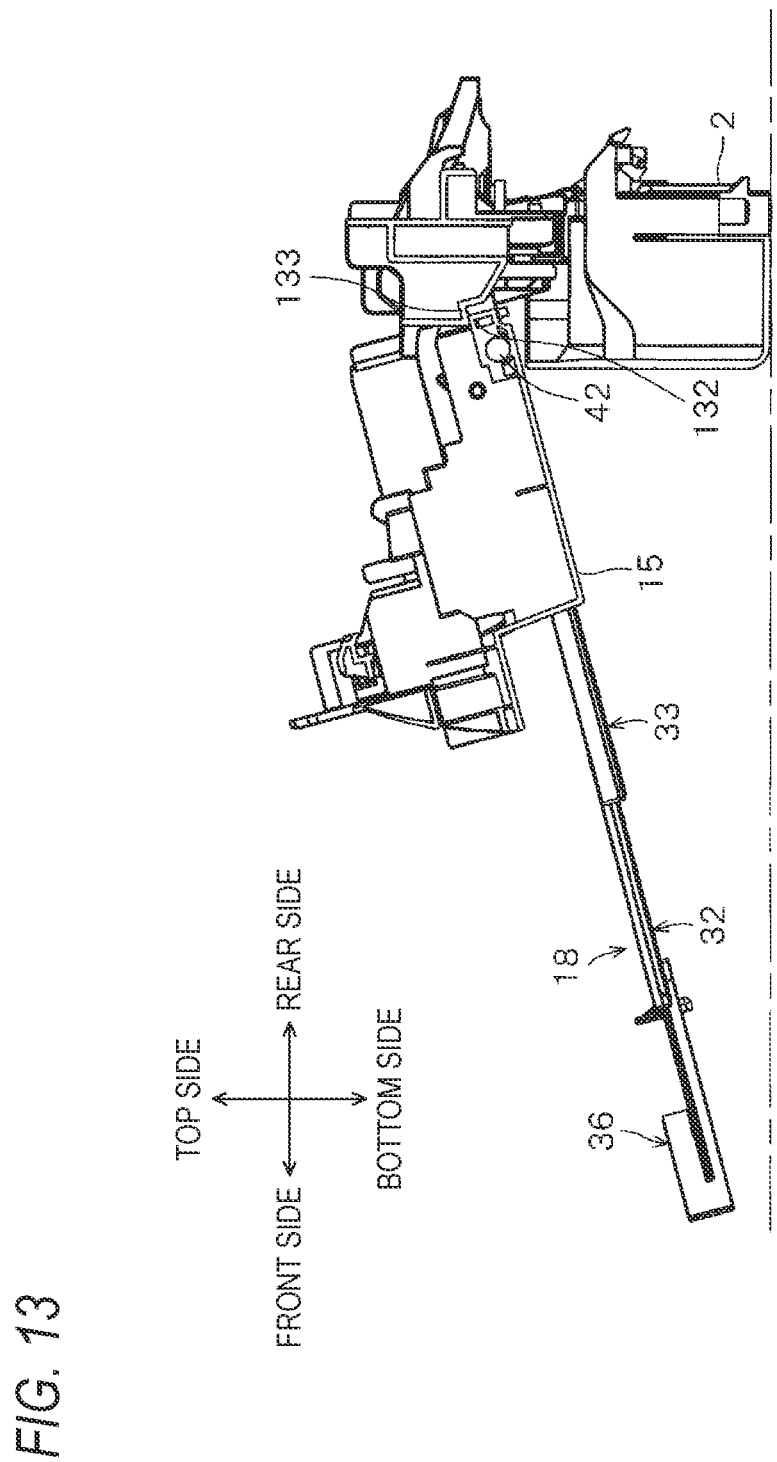
FIG. 13 is a cross-sectional view showing a state where the case and the front door are cut along a surface extending in the top-to-bottom direction and the front-to-rear direction, illustrating that the front door is located at an opened position, the cover tray is opened, the first slide tray is drawn to an exposure position, the second slide tray is drawn to a draw position, and the first and second turning trays are located at an extended position.

As understood through a comparison between FIGS. 11 and 12, the turn amount of the front door 15 is smaller than the turn amount of the multi-purpose tray 18. Although the front door 15 is located at the closed position and the multi-purpose tray 18 is located at the in-use position as illustrated in FIG. 13, the turn amount of the front door 15 is set to such an extent that the first turning tray 35 and the second turning tray 36 do not come in contact with the installation surface of the multi-function apparatus 1.

Advantages

As described above, the multi-function apparatus 1 employs a so-called in-body sheet discharge type configuration in which the image reading device 3 is disposed over the image forming device 2 and the output tray 19 for receiving a sheet ejected from the image forming device 2 is provided between the image forming device 2 and the image reading device 3.

The image forming device 2 includes the front door 15 and the multi-purpose tray 18. The front door 15 can be moved between the closed position set along a side surface of the image forming device 2 at one side of the case 11 and the opened position opened at the one side with respect to the side surface. The front door 15 has the opening 17 formed therein. The multi-purpose tray 18 can be selectively located at the non-use state at which the multi-purpose tray 18 closes the opening 17 and the in-use position at which the multi-purpose tray 18 opens the opening 17, and support sheets while being located at the in-use position.

When the front door 15 is located at the closed position and the multi-purpose tray 18 is located at the non-use position, the upper end surface of the multi-purpose tray 18 is exposed upward. Accordingly, when the front door 15 is located at the closed position, a large gap can be secured between the image forming device 2 and the image reading device 3 disposed over the image forming device 2, compared to the configuration in which a part of the case 11 or the front door 15 is present on the multi-purpose tray 18 located at the non-use position.

Therefore, it is possible to reduce the size of the multi-function apparatus1 while securing the height of the opening between the image reading device 3 and the image forming device 2.

The multi-purpose tray 18 includes the cover tray 31 and the second slide tray 34. The second slide tray 34 can be selectively located at the overlap position at which the second slide tray 34 overlaps the top of the cover tray 31 and the draw position at which the second slide tray 34 is drawn from the overlap position such that the overlap with the cover tray 31 is reduced. Therefore, as the second slide tray 34 is slid from the overlap position to the draw position, the area of the multi-purpose tray 18 can be expanded, and sheets having a larger size can be supported by the multi-purpose tray 18.

The multi-purpose tray 18 includes the first turning tray 35 and the second turning tray 36. The first turning tray 35 and the second turning tray 36 can be displaced from the folded position at which the first turning tray 35 and the second turning tray 36 overlap the second slide tray 34 and the extended position at which the first turning tray 35 and the second turning tray 36 are extended to reduce the overlap with the second slide tray 34. Therefore, as the first turning tray 35 and the second turning tray 36 are located at the extended position, the area of the multi-purpose tray 18 can be further expanded, and sheets having a larger size can be supported by the multi-purpose tray 18.

The multi-purpose tray 18 further includes the first slide tray 33. The first slide tray 33 can be slid between the storage position at which the first slide tray 33 is stored between the cover tray 31 and the positioning tray 32 and the exposure position at which the first slide tray 33 is exposed from between the cover tray 31 and the positioning tray 32, the exposure position corresponding to a more forward position than the storage position. Therefore, as the first slide tray 33 is located at the exposure position, the area of the multi-purpose tray 18 can be further expanded, and sheets having a larger size can be supported by the multi-purpose tray 18.

When the first turning tray 35 and the second turning tray 36 are located at the folded position and the second slide tray 34 is located at the overlap position, the left protrusion part 123 of the first turning tray 35 comes in contact with the left guide part 85 and the front edge of the first slide tray 33, and the right protrusion part 124 of the second turning tray 36 comes in contact with the right guide part 86 and the front edge of the first slide tray 33. Accordingly, the left guide part 85 of the first slide tray 33 is covered by the left protrusion part 123, and the right guide part 86 is covered by the right protrusion part 124. Therefore, it is possible to improve the design effect when the first turning tray 35 and the second turning tray 36 are located at the folded position and the second slide tray 34 is located at the overlap position.

The second slide tray 34 has the finger grip part 127 formed thereon. The cover tray 31 has the notch portion 128 formed in the central portion at the front end thereof. When the first turning tray 35 and the second turning tray 36 are located at the folded position, the second slide tray 34 is located at the overlap position, and the first slide tray 33 is located at the storage position, the finger grip part 127 is fitted to the notch portion 128 of the cover tray 31. When the finger grip part 127 is held with a user's finger and drawn forward while the front door 15 is located at the closed position and the multi-purpose tray 18 is located at the non-use position, the cover tray 31, the positioning tray 32, the first slide tray 33, the second slide tray 34, the first turning tray 35 and the second turning tray 36 can be reclined forward as one body. Therefore, when they are reclined, the multi-purpose tray 18 can be suppressed from bending.

The multi-purpose tray 18 can be reclined forward from the non-use position, and used when the first turning tray 35 and the second turning tray 36 are located at the folded position, the second slide tray 34 is located at the overlap position, and the first slide tray 33 is located at the storage position. In this state, the upper protrusion part 105 of the first turning tray 35 is aligned on a straight line with the left side of the upper protrusion part 121 of the second slide tray 34, and the upper protrusion part 107 of the second turning tray 36 is aligned on a straight line with the right side of the upper protrusion part 121. Therefore, in the multi-purpose tray 18, a small-size sheet such as a postcard can be supported by the positioning tray 32 and the upper protrusion part 121 of the second slide tray 34. Furthermore, a sheet can be supported by the upper protrusion part 105 of the first turning tray 35, the upper protrusion part 107 of the second turning tray 36 and the upper protrusion part 121 of the second slide tray 34.

The first slide tray 33 includes the center guide parts 71 and 72. The second slide tray 34 includes the center guide parts 91 and 92. The center guide parts 91 and 92 have a cross-sectional shape that covers the center guide parts 71 and 72 of the first slide tray 33 from the left and right sides and the top side. The center guide parts 91 and 92 have the regulated parts 95 and 96 formed thereon, respectively. The regulated part 95 faces the regulating part 83 formed on the center guide part 71 from the bottom, and the regulated part 96 faces the regulating part 84 formed on the center guide part 72 from the bottom. Accordingly, the regulating parts 83 and 84 are held by the center guide parts 91 and 92, respectively, from the top and bottom. Therefore, the strength of the connection portion between the first slide tray 33 and the second slide tray 34 can be increased to make it possible to suppress the first slide tray 33 and the second slide tray 34 from bending.

The portion along which the first slide tray 33 is slid with the cover tray 31 according to the displacement of the first slide tray 33 and the portion along which the second slide tray 34 is slid with the first slide tray 33 according to the displacement of the second slide tray 34 have the plurality of protrusions provided in parallel to each other such that the irregularities are formed thereon. Accordingly, it is possible to reduce sliding resistance when the first slide tray 33 and the second slide tray 34 are displaced, and to suppress an occurrence of noise by the sliding.

The front door 15 has the extension portion 132 extended from the left shaft part 41 and the right shaft part 42 to the leading end and the opposite side thereof. Furthermore, when the front door 15 is located at the closed position, the extension portion 132 comes in contact with the frame 133 formed in the case 11 from the bottom. Accordingly, it is possible to regulate the turn amount of the front door 15. Moreover, since the extension portion 132 is brought in contact with the frame 133 having large strength, it is possible to not only increase the size of the extension portion 132 in the front-to-rear direction or the side-to-side direction, but also decrease the size of the extension portion 132 in the top-to-bottom direction when the front door 15 is located at the closed position. As a result, the top-to-bottom size of the multi-function apparatus 1 can be reduced.

Figure 14:
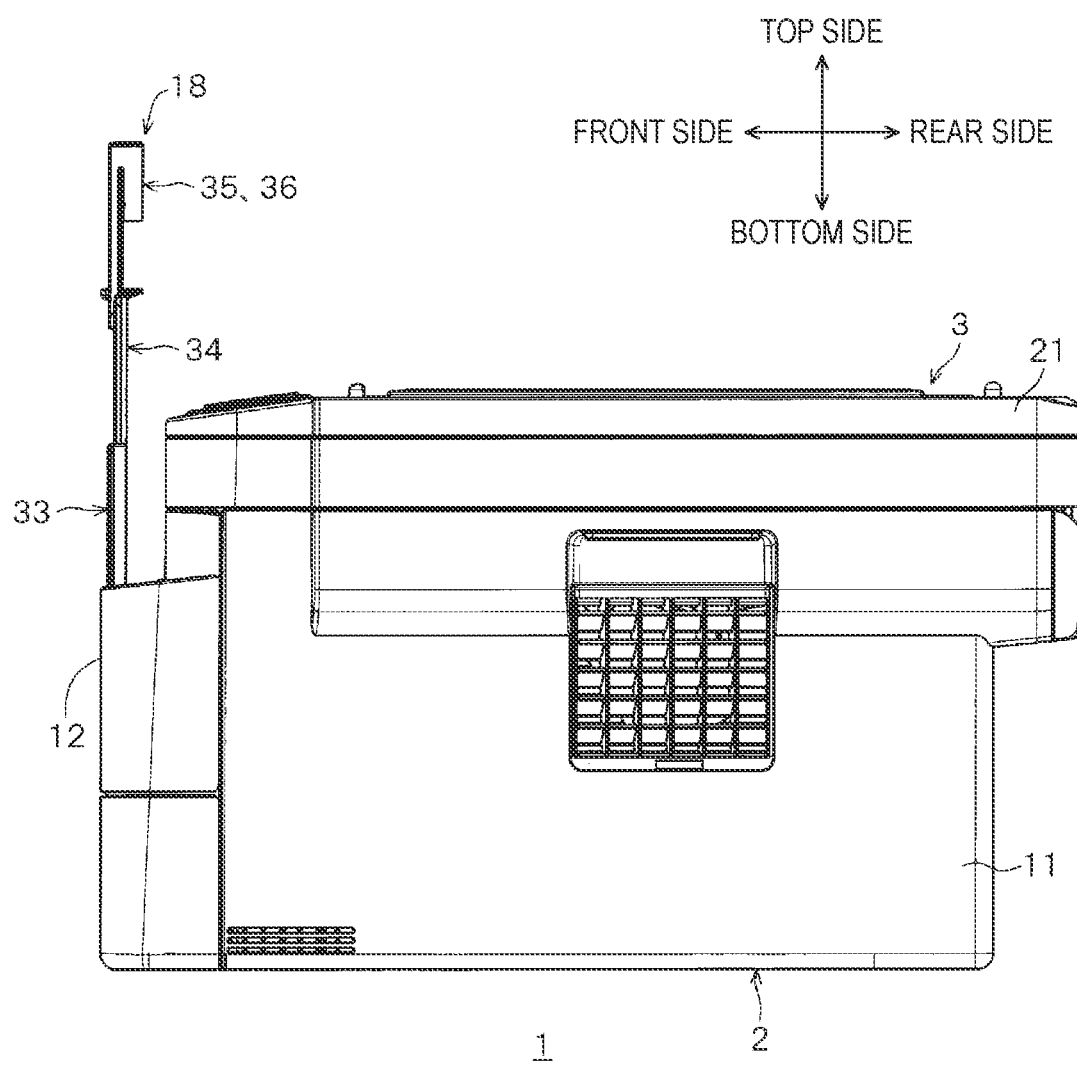
FIG. 14 is a side view of the multi-function apparatus, illustrating the front door is located at the closed position, the cover tray is closed, the first slide tray is drawn to the exposure position, the second slide tray is drawn to the draw position, and the first and second turning tray are located at the extended position.

When the multi-purpose tray 18 is located at the non-use position, the upper end surface of the multi-purpose tray 18 is exposed upward, and disposed more forward than the front end of the case 11. Accordingly, when the cover tray 31 is closed along the front surface of the case 11 as illustrated in FIG. 14, the first slide tray 33 can be drawn from the storage position to the exposure position, the second slide tray 34 can be drawn from the overlap position to the draw position, and the first turning tray 35 and the second turning tray 36 can be displaced from the folded position to the extended position. The cover tray 31 can be opened forward from this state. Moreover, after the cover tray 31 is opened forward, the first slide tray 33 can be drawn from the storage position to the exposure position, the second slide tray 34 can be drawn from the overlap position to the draw position, and the first turning tray 35 and the second turning tray 36 can be displaced from the folded position to the extended position. Therefore, the multi-function apparatus 1 can be conveniently used by a user. Furthermore, while the first slide tray 33 is drawn to the exposure position, the second slide tray 34 is drawn to the draw position, and the first turning tray 35 and the second turning tray 36 are located at the extended position, the cover tray 31 can be closed from the opened state. Moreover, although such an operation is performed, the multi-purpose tray 18 does not collide with the case 11, which makes it possible to prevent a damage of the multi-purpose tray 18.

Modification

So far, the embodiment of the present disclosure has been described, but the present disclosure can be modified into another embodiment.

For example, the first turning tray 35 and the second turning tray 36 may be omitted, in order to appropriately change the configuration of the multi-purpose tray 18.

In addition, the above-described configuration can be modified in various manners within the range of contents described in the scope of claims.

According to an aspect of the present disclosure, there is provided a multi-function apparatus including: an image forming device configured to form an image on a sheet; an image reading device configured to read an image from an original document, the image reading device being disposed at a position above the image forming device; and an output tray configured to receive a sheet ejected from the image forming device, the output tray being disposed at a position between the image forming device and the image reading device. The image forming device includes: a case; a door having an opening that allows a sheet to pass through, the door being configured to be selectively located at a closed position along a side surface of one side of the case and an opened position at which the door is opened toward the one side from the one side surface; and a sheet tray configured to be selectively located at a non-use position at which the sheet tray closes the opening and an in-use position at which the sheet tray opens the opening and be allowed to support a sheet. A top surface of the sheet tray is exposed upward in a state where the door is located at the closed position and the sheet tray is located at the non-use position.

The multi-function apparatus employs a so-called in-body sheet discharge type configuration in which the image reading device is disposed over the image forming device, and the output tray is provided between the image forming device and the image reading device and configured to receive a sheet ejected from the image forming device.

The image forming device includes the door and the sheet tray. The door can be selectively located at the closed position set along the side surface of the case of the image forming device at the one side thereof and the opened position at which the door is opened to the one side with respect to the side surface. The door has the opening formed therein. The sheet tray can be selectively located at the non-use position at which the sheet tray closes the opening and the in-use position at which the sheet tray opens the opening, and support a sheet while being located at the in-use position.

When the door is located at the closed position and the sheet tray is located at the non-use position, the top surface of the sheet tray is exposed upward. Accordingly, it is possible to secure a larger space (opening height) between the image forming device and the image reading device disposed over the image forming device than in a configuration in which a part of the case or the door is present over the sheet tray located at the non-use position, when the door is located at the closed position.

Accordingly, it is possible to reduce the size of the multi-function apparatus while securing the height of the opening between the image reading device and the image forming device.

According to the embodiment of the present disclosure, it is possible to provide an in-body sheet discharge type multi-function apparatus which can be reduced in size while securing a space between an image reading device and an image forming device.

What is claimed is:

1. A multi-function apparatus comprising:
an image forming device configured to form an image on a sheet, the image forming device including:
a case having an opening;
a front door being movable between a closed position at which the opening is closed by the front door and an opened position at which the opening is not closed by the front door;
a multi-purpose tray being pivotable about an axis extending in a first direction between a non-use position and an in-use position at which the multi-purpose tray is configured to support a sheet and being extendable in a second direction perpendicular to the first direction, the multi-purpose tray including:
a cover tray including a shaft part supported by the case so that the cover tray is pivotable about the shaft part;
a positioning tray being stacked over the cover tray with a gap formed between the cover tray and the positioning tray;
a first slide tray supported by the cover tray to be slidable with respect to the cover tray in the second direction; and
a second slide tray supported by the first slide tray to be slidable with respect to the first slide tray in the second direction; and
an output tray configured to receive the sheet ejected from the image forming device; and
an image reading device configured to read an image from an original document, the image reading device being disposed at a position above the output tray,
wherein, in a case where the front door is located at the closed position and the multi-purpose tray is located at the non-use position, at least a part of the front door is disposed between the case and the multi-purpose tray.

2. The multi-function apparatus according to claim 1, wherein, in a case where the multi-purpose tray is located at the in-use position, a leading end of the multi-purpose tray is located under an edge of the output tray.

3. The multi-function apparatus according to claim 1, wherein, in a case where the multi-purpose tray is located at the non-use position, a leading end of the multi-purpose tray is located outside of an area under the image reading device.

4. The multi-function apparatus according to claim 1, wherein the second slide tray includes a finger grip part at a leading end of the second slide tray, the finger grip part being configured to protrude in the second direction from the leading end of the second slide tray.

5. The multi-function apparatus according claim 1, wherein the first slide tray is configured to be slidable between a storage position at which the first slide tray is stored in the gap between the cover tray and the positioning tray and an exposure position at which the first slide tray is exposed from the gap.

6. The multi-function apparatus according to claim 1, wherein, in a case where the multi-purpose tray is at the non-use position, at least a part of the first slide tray is disposed between the cover tray and the case.

7. The multi-function apparatus according to claim 1, wherein, when the image forming device ejects the sheet onto the output tray, the image forming device feeds the sheet in a third direction perpendicular to the first direction.

8. A multi-function apparatus comprising:
an image forming device configured to form an image on a sheet, the image forming device including:
a case having an opening;
a front door being movable between a closed position at which the opening is closed by the front door and an opened position at which the opening is not closed by the front door;
a multi-purpose tray being pivotable about an axis extending in a first direction between a non-use position and an in-use position at which the multi-purpose tray is configured to support a sheet and being extendable in a second direction perpendicular to the first direction, the multi-purpose tray including:
a cover tray including a shaft part supported by the case so that the cover tray is pivotable about the shaft part;
a first slide tray supported by the cover tray to be slidable with respect to the cover tray in the second direction; and
a second slide tray supported by the first slide tray to be slidable with respect to the first slide tray in the second direction; and
an output tray configured to receive the sheet ejected from the image forming device; and
an image reading device configured to read an image from an original document, the image reading device being disposed at a position above the output tray,
wherein, in a case where the front door is located at the closed position and the multi-purpose tray is located at the non-use position, at least a part of the front door is disposed between the case and the multi-purpose tray,
wherein the second slide tray includes a turning tray; and
wherein the turning tray is turnably supported by the second slide tray.

9. The multi-function apparatus according to claim 8, wherein, in a case where the multi-purpose tray is located at the in-use position, a leading end of the multi-purpose tray is located under an edge of the output tray.

10. The multi-function apparatus according to claim 8, wherein, in a case where the multi-purpose tray is located at the non-use position, a leading end of the multi-purpose tray is located outside of an area under the image reading device.

11. The multi-function apparatus according to claim 8, wherein the second slide tray includes a finger grip part at a leading end of the second slide tray, the finger grip part being configured to protrude in the second direction from the leading end of the second slide tray.

12. The multi-function apparatus according to claim 1, wherein, in a case where the multi-purpose tray is at the non-use position, at least a part of the first slide tray is disposed between the cover tray and the case.

13. The multi-function apparatus according to claim 1, wherein, when the image forming device ejects the sheet onto the output tray, the image forming device feeds the sheet in a third direction perpendicular to the first direction.

* * * * *